United States Patent Office 2,910,846
Patented Nov. 3, 1959

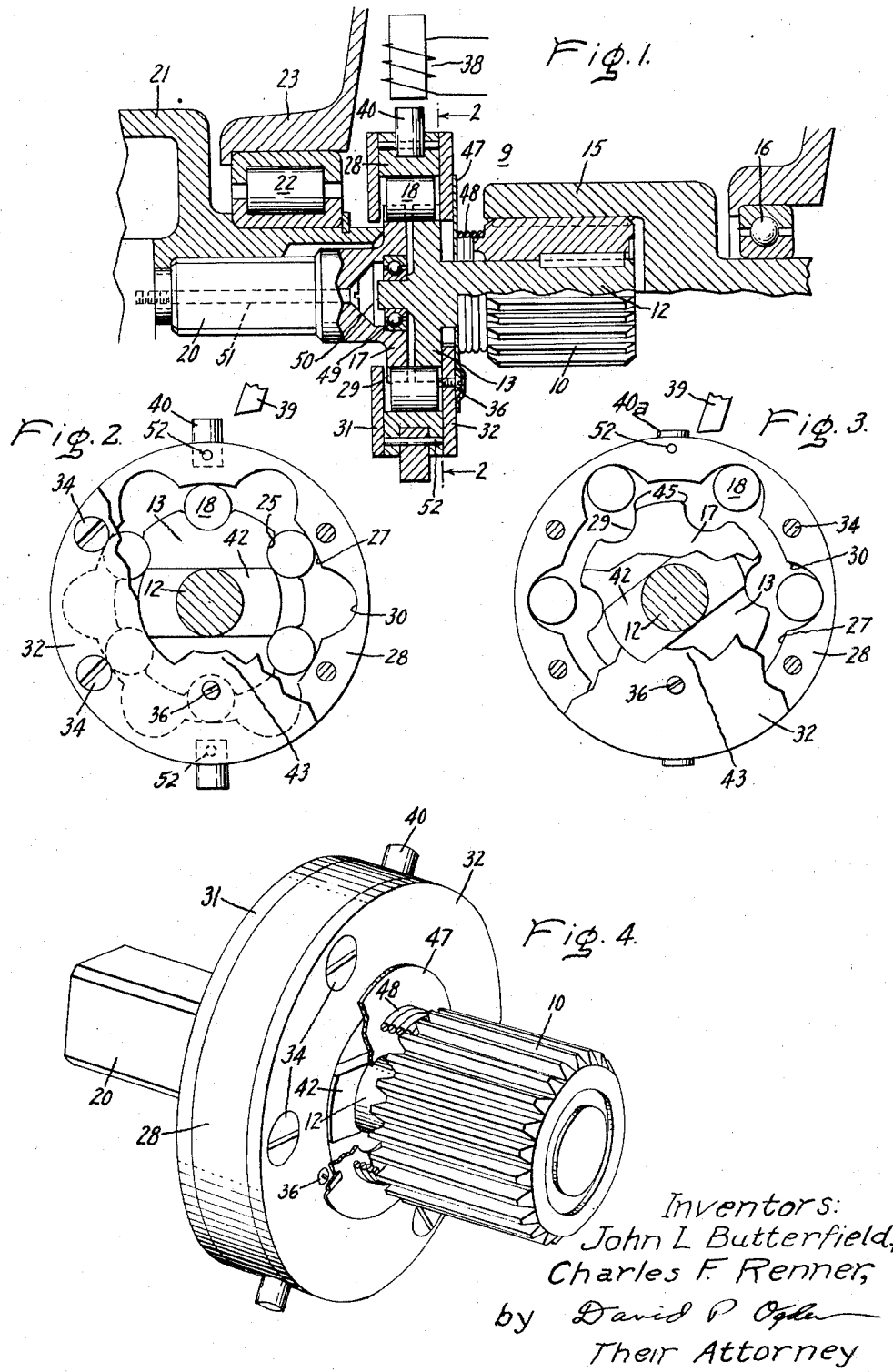

2,910,846

DISCONNECTABLE CLUTCH

John L. Butterfield and Charles F. Renner, Erie, Pa., assignors to General Electric Company, a corporation of New York Application November 4, 1957, Serial No. 694,352

6 Claims. (Cl. 64—28)

Our invention relates to a disconnectable clutch, and, more particularly, to a clutch suitable for aircraft use which may be quickly and permanently disconnected during emergency conditions.

In aircraft, it is often necessary, for the safety of the plane and crew, to deenergize electrical equipment from an engine which can not be stopped. This may be necessary when electrical wiring is damaged or when a generator bearing fails and continued use of the generator may cause a fire. It also may be desirable to disconnect auxiliary power when all available power of the engine is required for propelling the aircraft. The lack of such a disconnectable clutch may result in unnecessary fires or loss of aircraft. Attempts to use a magnetic clutch or an elaborate gearing arrangement have been found to be unsatisfactory because of the excessive expense and weight.

Therefore, an object of our invention is to provide a simple, reliable lightweight disconnectable clutch.

Briefly, in accordance with one modification of our invention, a drive shaft is made in two longitudinally positioned sections with rollers drivably connecting two mating flanged portions or discs which rotate about the same axis. When it is desired to disconnect the generator, a coaxial ring, normally holding the rollers in aligned radial grooves in the periphery of the mating discs, is rotated relative to the discs to allow the rollers to move radially into recesses of the ring.

The subject matter which we regard as our invention is particularly pointed out and distinctly claimed in the concluding portion of this specification. Our invention, however, as to its organization and method of operation together with further objects and advantages thereof may best be understood by reference to the following description taken in connection with the accompanying drawing, in which:

Fig. 1 is a plan view partially in section of a disconnectable clutch in accordance with one modification of our invention;

Fig. 2 is an end view partially broken away taken along the line 2—2 of Fig. 1 with the clutch engaged;

Fig. 3 is an end view partially broken away with the clutch disengaged; and

Fig. 4 is a perspective view partially in section of the assembled clutch.

Referring now to the drawing, in which like numerals designate similar parts, we have shown in Fig. 1 a clutch 9 having a pinion gear 10 drivingly secured to a shaft stub 12 having thereon a flange or disc 13. The pinion gear 10 is driven by a spline gear 15 which is supported in a bearing 16 and is driven by some type of engine which must remain in operation under emergency conditions. Obviously, if the engine is in an aircraft, it would be inconvenient to stop it under emergency conditions.

It may be necessary from time to time to disconnect from the engine all unessential power consuming equipment. Therefore, the disc 13 is axially aligned with a mating disc 17 and drivably connected thereto by six keys or rollers 18 to drive a similar stub shaft 20. The number of rollers used will usually be more than one to facilitate balancing of the clutch 9. For a given load, the size of the rollers 18 will depend on the number used and their radial location, which determines the ratio between their shear and torsional strength. Obviously, a greater number of rollers will require more elaborate and expensive machining of the disc surfaces. Mechanical design and machining considerations will determine the most economical number of rollers.

In the particular application shown, the stub shaft 20 is secured to an armature 21 of a generator which is rotatably mounted in bearings 22 supported within a generator housing 23. Under normal conditions, with the clutch 9 connected, rotation of the gear 15 will drive the generator armature 21 to supply electrical power for the aircraft radar and control systems. In one application we have tested, a one pound clutch 9 transmits sufficient power to operate a 60 k.v.a. generator.

According to our invention, as shown in Fig. 2, the periphery of the disc 13 is provided with a plurality of arcuate radial grooves 25 in which the rollers 18 are maintained by the coaxial surfaces 27 of a sleeve 28. There are similar aligned grooves 29 (Fig. 3) in the disc 17. Between each of the surfaces 27 is a recess 30 extending outwardly from the disc 13 a distance sufficient to accept a roller 18 without its engaging the disc 13 (Fig. 3). When the rollers 18 are in the recesses 30, they are prevented from escaping axially by the washers 31 and 32 which are secured to the sleeve 28 by a conventional means such as the bolts 34.

In order to prevent undesired relative rotation between the driven disc 13 and the sleeve 28, we have provided a relatively soft bolt 36 which passes through the washer 32 to engage either the disc 13 or, as shown in the drawing, one of the rollers 18 to maintain proper alignment between the rollers 18 and the surface 27. We contemplate that in many applications, a bolt 36 will be unnecessary and that the frictional engagement between the rollers 18 and the surfaces 27 will prevent undesired relative rotation.

According to one application of our invention, when the electrical system is damaged creating a fire hazard, or when one of the engines of a multi-engine aircraft fails, the sleeve 28 will be rotated to allow release of the rollers 18 from the grooves 25 to the recesses 30. A simple means for accomplishing this is to deenergize a solenoid 38 to release the pin 39 allowing it to drop down to the position shown in Fig. 3 and there engage the relatively soft steel pins 40. The pins 40 are designed to be sheared by the pin 39 only after the sleeve 28 has been rotated sufficiently to allow the rollers 18 to enter the recesses 30. Rupture of the pins 40 to leave the residue stubs 40a shown in Fig. 3, is assured by a detent 42 on the disc 13 which will engage a detent 43 on the washer 32 to allow enough relative rotation between the disc 13 and the sleeve 28 to enhance the rollers moving outwardly into the recesses 30 as shown in Fig. 3. An acceptable strength of the pins 40 will be determinable by the normal speed of rotation and the mass of the ring 28 (momentum) plus the frictional forces between the rollers 18 and the surfaces 27 and the force necessary to shear the soft bolt 36.

The detent 43 must be strong enough to assure shearing of the pins 40 so that the sleeve 28 will rotate with the gear 10 to maintain by centrifugal force the rollers 18 in the recesses 30 and thus eliminate any likelihood of their being jammed between the sleeve 28 and the disc 17 to provide an undesired driving connection. We prefer to have the disc 13 rotated relative to the sleeve 28 an amount (Fig. 3) which will cause the extended portions between the grooves 25 to inhibit admission of the rollers 18 into the grooves 25 even if rotation of the sleeve 28 were stopped. Because of the strength necessary in the detent 43, we prefer that the washer 32 be made of steel.

During disconnected rotation of the clutch 9 in order to reduce vibrational engagement between the rollers 18 and the disc 17, we prefer to chamfer the outer corners 45 of the grooves 29 (Fig. 3).

Referring now to Fig. 4, we have shown the stub 20 as a rectangular shaft. It is obvious that a used clutch member 9 may be replaced by simply inserting the stub 20 in the driven armature and then positioning the armature relative to the driving gear 15 to provide a driving engagement between the gear 15 and the pinion gear 10.

When the clutch is engaged, the members 12, 13, 17, 18 and 28 operate as a single unit of an ordinary drive shaft. However, when the clutch 9 is disconnected, the rigidity is lost and these elements might tend to move in a manner which would cause them to interfere with each other. Figs. 1 and 4 clearly show a resilient plate 47 maintainable against the washer 32 by a resilient means such as a helical spring 48. The pressure developed between the plate 47 and the washer 32 is selected to be sufficient to prevent wobble of the washer 32 during disconnect conditions. In Fig. 4, the plate 47 and the spring 48 are broken away partially to show a perspective view of the detent 42 on the disc 13 with the rollers 18 in the driving position.

During disconnected operation misalignment of the discs 13 and 17 is prevented by a frictionless bearing 49 connecting an extension 50 of the disc 13 to the disc 17. It should be noted that in Fig. 1 the stub shaft 20 is secured to the armature 21 by a bolt 51 to prevent any looseness during disconnect operation. In order to prevent binding during relative rotation between the disc 17 and the washer 31, we prefer to have the washer 31 made of an acceptable bearing material such as brass. Thus, the likelihood of an undesired driving connection between the washer 31 and the disc 17 may be eliminated.

We contemplate the reuse of each clutch by simply resetting the rollers 18 in the grooves 25 and 29 to provide a driving connection. After a disconnection of the clutch, when the means driving the gear 15 may be stopped, it is a relatively simple matter to reset the clutch 9. One or both of the washers 31 and 32 are removed from the sleeve 28 and the discs 13 and 17 are positioned with their respective grooves 25 and 29 aligned. With the surfaces 27 properly positioned, the rollers 18 are forced into the aligned grooves 25 and 29. The bolt 36 is also replaced to secure the assembly.

In order to prevent loosening of the pins 40 during operation, we have also found it desirable to provide cotter ways containing roll pins 52 which are positioned to establish the desired height of the pin 40. Obviously, after one disconnection, the pin stubs 40a must be replaced to allow a future disconnection of the clutch 9 by the steel pin 39.

While we have illustrated and described particular embodiments of our invention, other modifications will occur to those skilled in the art. For instance, other means for stopping the sleeve 28 could be employed. Moreover, our disconnectable clutch can be used in applications other than the one referred to. We intend, therefore, to cover in the appended claims all such modifications as fall within the true spirit and scope of our invention.

What we claim as new and desire to secure by Letters Patent of the United States is:

1. A disconnectable clutch comprising, a first rotatable disc having a first radial groove in the periphery thereof, a second disc rotatable about the same axis as the first disc and having a second similar peripheral groove axially alignable with the first groove, a roller positioned in the first and second grooves for drivably connecting the first disc to the second disc, and a rotatable sleeve having an inner radially directed surface positionable to maintain the roller in said aligned grooves, the sleeve having a radial recess therein of a depth which will allow the roller to leave the aligned grooves for receiving the roller when the sleeve is rotated a predetermined amount whereby the first and second discs may rotate independently.

2. A disconnectable clutch comprising, a first rotatable disc shaped member having a first radial groove in the periphery thereof, a second member rotatable about the same axis as the first member and having a second similar peripheral groove alignable with the first groove, a roller maintainable in the first and second grooves drivably connecting the first member to the second member, and means for causing the removal of the roller in radial direction to disconnect the first member and the second member for independent rotation.

3. A disconnectable clutch comprising, a first rotatable disc having a first radial groove in the periphery thereof, a second rotatable disc rotatable about the same axis as the first disc and having a second similar peripheral groove alignable with the first groove, a roller maintainable in the first and second grooves for drivably connecting the first disc to the second disc, and a member positionable to maintain the roller in the aligned grooves, the member being movable relative to the grooves to allow release of the roller under the influence of centrifugal force whereby the first and second discs may rotate independently.

4. A disconnectable clutch comprising, a first rotatable disc having a first radial groove in the periphery thereof, a second disc rotatable about the same axis as the first disc and having a second similar peripheral groove alignable with the first groove, a roller maintainable in the first and second grooves for drivably connecting the first disc to the second disc, a rotatable sleeve having an inner surface positionable to maintain said roller in the aligned grooves, the sleeve having a radial recess therein of a depth which will allow the roller to leave the aligned grooves for receiving the roller when the sleeve is rotated a predetermined amount, fastening means for inhibiting undesired relative rotation between said sleeve and the roller, and means operable under emergency conditions for overcoming the fastening means and any frictional force between the sleeve and the roller to cause relative rotation of the sleeve said predetermined amount whereby the first and second discs may rotate independently.

5. A disconnectable clutch comprising, a first rotatable disc having a first radial groove in the periphery thereof, a second disc rotatable about the same axis as the first disc and having a second similar peripheral groove alignable with the first groove, a roller maintainable in the first and second grooves for drivably connecting the first disc to said second disc, a rotatable sleeve having an inner surface positionable to maintain the roller in the aligned grooves, the sleeve having a radial recess therein of a depth which will allow the roller to leave the aligned grooves for receiving the roller when the sleeve is rotated a predetermined amount, fastening means for inhibiting undesired relative rotation between the sleeve and the roller, mechanical means operable to engage the sleeve for overcoming the fastening means and any frictional force between the sleeve and the roller to cause relative rotation of the sleeve said predetermined amount whereby the first and second disc may rotate independently, a detent secured to the sleeve, and a detent secured to the first disc for engaging the sleeve detent and preventing continued relative rotation therebetween whereby continued rotation of the first disc will cause the sleeve to rotate during disconnected operation of the clutch to maintain the rollers in the recesses by centrifugal force.

6. A disconnectable clutch comprising, a first rotatable disc having a first radial groove in the periphery thereof, a second disc rotatable about the same axis as the first disc and having a second similar peripheral groove alignable with the first groove, a roller maintainable in the first and second grooves for drivably connecting the first disc to the second disc, a rotatable sleeve having an inner surface positionable to maintain the roller in the aligned grooves, the sleeve having a radial recess therein of a depth which will allow the roller to leave the aligned grooves for receiving the roller when the sleeve is rotated a predetermined amount, fastening means for inhibiting undesired relative rotation between the sleeve and the roller, a projection on the sleeve, a movable pin operable to engage the projection for overcoming the fastening means and any frictional force between the sleeve and the roller to cause relative rotation of the sleeve said predetermined amount whereby the first and second disc may rotate independently, a detent secured to the sleeve, a detent secured to the first disc for engaging the sleeve detent and preventing continued relative rotation therebetween whereby continued rotation of the first disc will cause the sleeve to rotate during disconnected operation of the clutch to maintain the rollers in the recesses by centrifugal force, resilient means connecting the sleeve to the first disc to prevent misalignment thereof during disconnected operation, and bearing means connecting the first disc to the second disc to prevent misalignment thereof during disconnected operation.

References Cited in the file of this patent

UNITED STATES PATENTS

| | | |
|---|---|---|
| 499,183 | Dahl | June 6, 1893 |
| 2,490,172 | Swahnberg | Dec. 6, 1949 |
| 2,493,232 | Dodge | Jan. 3, 1950 |
| 2,775,327 | Gearhart | Dec. 25, 1956 |